United States Patent
Oshio et al.

(10) Patent No.: US 6,290,875 B1
(45) Date of Patent: Sep. 18, 2001

(54) TRIVALENT RARE EARTH ION-CONTAINING ALUMINATE PHOSPHOR, A METHOD FOR PRODUCING THE SAME AND A LIGHT EMITTING DEVICE USING THE SAME

(75) Inventors: Shouzo Oshio; Teruaki Shigeta; Tomizo Matsuoka, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/500,184

(22) Filed: Feb. 8, 2000

(30) Foreign Application Priority Data

Feb. 12, 1999 (JP) ................................. 11-034158

(51) Int. Cl.$^7$ ................................................. C09K 11/08
(52) U.S. Cl. ...................................... 252/301.4 R
(58) Field of Search ........................ 252/301.4 R

(56) References Cited

U.S. PATENT DOCUMENTS

| | | | |
|---|---|---|---|
| 4,216,408 | 8/1980 | Verstegen et al. | 313/468 |
| 4,263,164 | * 4/1981 | Swinkels et al. | 252/301.4 R |
| 4,382,207 | 5/1983 | Jan Verstegen et al. | 313/486 |
| 4,441,049 | 4/1984 | Verstegen et al. | 313/486 |
| 4,837,481 | 6/1989 | Verstegen et al. | 313/486 |
| 5,879,586 | 5/1999 | Kitamura et al. | 252/301.4 R |

FOREIGN PATENT DOCUMENTS

| | | |
|---|---|---|
| 2259095-A | * 3/1993 | (GB) . |
| 2 259 095 A | 3/1993 | (GB) . |
| 49123992-A | * 11/1974 | (JP) . |
| 49-123992 A | 11/1974 | (JP) . |
| 63 130694 A | 6/1988 | (JP) . |
| 9-291275 | 11/1997 | (JP) . |
| 10-53760 | 2/1998 | (JP) . |
| 10 110165 A | 4/1998 | (JP) . |
| 10-88127 | 4/1998 | (JP) . |
| 10-273656 | 10/1998 | (JP) . |

OTHER PUBLICATIONS

*Phosphor Handbook* (English with Japanese version) CRC Press 1999 pp. 389–444.
"Spherical Phosphors" from Optical Application/Visual Sense Workshop Material, Nov. 1998 pp. 19–25 (partial translation).
Phosphor Research Society, 270th Meeting Technical Digest, Feb. 1998, pp. 1–8 (partial translation).
Proceedings of the 4th International Display Workshops, Nov. 1997, pp. 621–624.

* cited by examiner

Primary Examiner—C. Melissa Koslow
(74) *Attorney, Agent, or Firm*—Merchant & Gould PC

(57) ABSTRACT

A method for producing a trivalent rare earth ion-containing aluminate phosphor includes preparing a phosphor raw material comprising a granular aluminum containing compound in a phosphor raw material production process, heating the phosphor raw material in an oxidizing atmosphere at a predetermined temperature (e.g., 1500° C. to 1800° C.) so as to produce an intermediate phosphor in an intermediate phosphor production process. After the intermediate phosphor is cracked, the intermediate phosphor is heated in a reducing atmosphere at a predetermined temperature (e.g., 1400° C. to 1800° C.) in a trivalent rare earth ion-containing aluminate phosphor production process. The heating temperature in a reducing atmosphere is equal to or less than the heating temperature in an oxidizing atmosphere. A post treatment is performed, if necessary. Thus, a trivalent rare earth ion-containing aluminate phosphor can be obtained.

20 Claims, 10 Drawing Sheets

TRIVALENT RARE EARTH ION-CONTAINING ALUMINATE PHOSPHOR, A METHOD FOR PRODUCING THE SAME AND A LIGHT EMITTING DEVICE USING THE SAME

BACKGROUND OF THE INVENTION

1. Field of the Invention

The present invention relates to a trivalent rare earth ion-containing aluminate phosphor used suitably as a phosphor for light emitting devices such as a fluorescent lamp and a method for producing the same. The present invention also relates to a light emitting device using the phosphor.

2. Description of the Prior Art

An aluminate phosphor such as $CeMgAl_{11}O_{19}:Tb^{3+}$, $Ce(III)MgAl_{11}O_{19}$, $Ce(III)MgAl_{11}O_{19}:Mn^{2+}$, and $CeMgAl_{11}O_{19}:Tb^{3+}$, $Mn^{2+}$ and phosphors based on a compound expressed by a chemical formula $Y_3Al_5O_{12}:Tb^{3+}$ or $Y_3Al_5O_{12}:Ce^{3+}$ are conventionally known examples of trivalent rare earth ion-containing aluminate phosphors for a light emitting device such as a fluorescent lamp.

Methods for producing such a trivalent rare earth ion-containing aluminate phosphor are as follows, for example: a method of heating a phosphor raw material to which a flux to accelerate chemical reaction among phosphor raw materials (e.g., a halogenide such as aluminum fluoride or a boride such as boric acid) is added using an electric furnace (e.g., Phosphor Handbook, p.227 and Japanese Laid-Open Patent Publication (Tokkai-Sho) No. 49-77893); a method of heating a phosphor raw material to which no flux is added (e.g., Japanese Laid-Open Patent Publication (Tokkai-Hei) Nos. 9-151372 and 10-88127); a method of heating a phosphor raw material containing granular α-alumina powder containing substantially no fractured planes (e.g., Japanese Laid-Open Patent Publication (Tokkai-Hei) Nos. 10-53760 and 10-273656); a method of dripping an aqueous solution mixed with raw material compounds, which can be a raw material for a phosphor, in the form of droplets into a solution cooled to the freezing point or below so as to produce a frozen body of a raw material solution for a phosphor, and heating a granular phosphor raw material obtained by drying the frozen body in a vacuum (e.g., Japanese Laid-Open Patent Publication (Tokkai-Hei) No. 9-291275); a method of heating a granular raw material for a phosphor obtained by spray-pyrolysis of a colloidal solution comprising an aluminum compound and a metal nitrate (e.g., Proceedings of the 3rd International Conference on the Science and Technology of Display Phosphors, p. 257 (1997)); a method of reacting rare earth ions and oxalic acid ions in the presence of an organic base, filtering the precipitated rare earth oxalate and washing it with water, allowing the rare earth oxalate to stand in the air where water vapor is not yet saturated or performing vacuum-drying or lyophilization so as to produce a phosphor raw material containing a granular rare earth compound (median grain size: about 1 to 6 μm) having a spherical grain shape and a uniform grain size distribution and heating the phosphor raw material (e.g., Japanese Laid-Open Patent Publication (Tokkai-Hei) No. 10-88127).

According to the method of heating the phosphor raw material containing the granular a -alumina powder, if α-alumina powder having a uniform grain size and a spherical shape or a pseudo-spherical shape close to a sphere is used, a trivalent rare earth ion-containing aluminate phosphor having a uniform grain size and a spherical shape or a pseudo-spherical shape close to a sphere can be produced.

Furthermore, it is known that according to a method of heating a granular phosphor raw material that can be obtained by vacuum-drying of the frozen body of the phosphor raw material solution or spray-pyrolysis of the colloidal solution, if a phosphor raw material having a uniform grain size and a spherical shape is used, a trivalent rare earth ion-containing aluminate phosphor having a uniform grain size and a spherical shape or a pseudo-spherical shape close to a sphere can be produced.

In the method of heating a phosphor raw material to which no a reactive accelerator is added, it is known that the grain shape of the α-alumina used for the phosphor raw material is substantially the same as that of the synthesized trivalent rare earth ion-containing aluminate phosphor (Japanese Laid-Open Patent Publication (Tokkai-Hei) No. 9-151372). It also is reported that a spherical α-alumina powder having a more uniform grain size than that of a conventional one is contained as a part of the phosphor raw material, a trivalent rare earth ion-containing aluminate phosphor having a uniform grain size and a spherical shape can be synthesized.

Furthermore, according to the method of heating the phosphor raw material containing an a -alumina powder having no fractured plane, it is known that not only can a trivalent rare earth ion-containing aluminate phosphor having substantially the same grain shape as that of the α-alumina powder be obtained, but also can the production yield be kept high (e.g., Japanese Laid-Open Patent Publication (Tokkai-Hei) Nos. 10-53760 and 10-273656).

Furthermore, it is disclosed that the method of heating the granular phosphor raw material (granular phosphor raw material obtained by vacuum-drying of the frozen body of the phosphor raw material solution or spray pyrolysis of the colloidal solution) can produce a trivalent rare earth ion-containing aluminate phosphor having substantially the same grain shape as that of the granular phosphor raw material (e.g., Japanese Laid-Open Patent Publication (Tokkai-Hei) No. 9-291275).

The specific surface area of the spherical aluminate phosphor having a uniform grain size described in Japanese Laid-Open Patent Publication (Tokkai-Hei) Nos. 9-151372, 10-53760, 10-273656, and 9-291275 is half of that of a conventional phosphor having a non-uniform grain size (Proceedings of the 270th Phosphor Conference of Phosphor Society, pp.1–8, Feb. 17, 1998). When such an aluminate phosphor having a uniform grain size is used, the heat deterioration resistance characteristics of the phosphor can improve and the total luminous flux of the fluorescent lamp improves. Furthermore, ion bombardment that the phosphors incur during illumination of the fluorescent lamp can be reduced so that the temporal change of the emission color during lamp illumination can be suppressed. These effects have been reported also by the inventors of the present invention (Electrical Engineers Society study group material, Optical Application and Vision study group, LAV-98-10, pp.19–25, Nov. 25, 1998).

Because of these advantages, aluminate phosphors (preferably, spherical phosphors) having a uniform grain size are regarded as being significant, especially as a phosphor for a small and narrow tube type fluorescent lamp.

The inventors of the present invention also confirmed that the spherical aluminate phosphors having a uniform grain size have the effect of improving the transmission luminance of the phosphor layer or improving the reflection luminance of the phosphor layer by being used in combination with a reflection layer (Proceedings of the 4th Int. Display Workshops, Nov. 19–21, 1997, Nagoya, pp.621–624).

Because of these advantages, the aluminate phosphors (preferably, spherical phosphors) having a uniform grain size are regarded as being most promising also as a phosphor capable of improving the emission intensity of a light emitting device (fluorescent lamp, plasma display, CRT (cathode ray tube), FED (field emission display) or the like).

Hereinafter, a conventionally known method for producing a trivalent rare earth ion-containing aluminate phosphor will be described briefly.

The trivalent rare earth ion-containing aluminate phosphor is produced basically by heating a phosphor raw material so as to effect a reaction in the phosphor raw material. The phosphor raw material is prepared by mixing a plurality of compound materials containing phosphor constituent elements with a mixing machine such as a ball mill. Alternatively, the phosphor raw material can be prepared by dripping an aqueous solution mixed with raw material compounds into a solution cooled to the freezing point or below so as to produce a frozen body of a phosphor raw material solution, and then drying the frozen body in a vacuum or performing spray pyrolysis of the colloidal solution. Alternatively, the phosphor raw material can be prepared by dissolving a plurality of nitrates containing phosphor constituent elements in a water, adding ammonium hydroxide thereto so as to produce a precipitate, and evaporating, drying and solidifying the precipitate.

In general, a halogenide such as aluminum fluoride or a boron compound such as boric acid is suitably added as a flux to the phosphor raw material. However, the trivalent rare earth ion-containing aluminate phosphor can be synthesized without adding the flux.

The phosphor raw material is heated. (fired) in the air or a reducing atmosphere (e.g., a mixed gas atmosphere of nitrogen and hydrogen). The firing may be performed several times repeatedly (e.g., Phosphor Handbook, Ohm-sha, pp. 207–240). In some cases, heating in the air may be performed before firing in a reducing atmosphere. In this case, heating in the air is performed generally at a low temperature in the range from 800 to 1500° C. (preliminary firing), and after preliminary firing, firing is performed in a reducing atmosphere at a temperature higher than that of the air in the range from 1200 to 1800° C. (main firing).

As described above, Japanese Laid-Open Patent Publication Nos. 9-151372, 10-53760, 10-273656 and 9-291275 and the Proceedings of the 3rd International Conference on the Science and Technology of Display Phosphors, p. 257 (1997) disclose a method for producing a phosphor that can provide phosphors that achieve a high performance light emitting device (phosphors, preferably spherical phosphors, having a uniform grain size).

However, with respect to a trivalent rare earth ion-containing aluminate phosphor, such a method cannot provide a phosphor that has both high luminescence performance and a desired grain shape derived from the (α-alumina powder, which is a part of the phosphor raw material, or a granular phosphor raw material containing aluminum.

Hereinafter, this point will be described in detail. As described in the above listed publications, in the case where a trivalent rare earth ion-containing aluminate phosphor is produced by firing a phosphor raw material, as it is or after preliminary firing in the air at a temperature not more than 1500° C., in a reducing atmosphere at a temperature higher than that for the preliminary firing in the range from 1200 to 1800° C. for several hours so as to effect a reaction in the phosphor raw material, the higher the firing temperature in the reducing atmosphere is, the higher the luminance that can be obtained. However, when the firing temperature is raised, the grain shape tends to be irregular and the grain shape of the α-alumina powder or the like can be maintained. For this reason, it has been difficult to achieve high luminance while maintaining the preferable form of the grain shape of the phosphor.

For a more specific explanation, FIG. 5 shows the relationship between the firing temperature and the luminance of a $CeMgAl_{11}O_{19}$: $Tb^{3+}$ trivalent rare earth ion-containing aluminate phosphor produced by the method as disclosed in Japanese Laid-Open Patent Publication No. 10-273656. FIG. 5 shows a luminance relative to the luminance of a $CeMgAl_{11}O_{19}$: $Tb^{3+}$ green phosphor produced by a method using a flux (hereinafter, also referred to as "commercially available phosphor"), which is expressed by 100.

As shown in FIG. 5, it is necessary to raise the firing temperature to 1700° C. or more in order to produce a trivalent rare earth ion-containing aluminate phosphor having a luminance comparable to the phosphor produced using a flux without a flux. However, the grain shape of the $CeMgAl_{11}O_{19}$: $Tb^{3+}$ green phosphor that has been fired at such a high temperature is irregular, even if spherical α-alumina powder having a uniform grain size is used as a part of the phosphor raw material.

In other words, even if the $CeMgAl_{11}O_{19}$: $Tb^{3+}$ trivalent rare earth ion-containing aluminate phosphor is produced using a spherical α-alumina powder having a uniform grain size as shown in FIG. 6($a$) (e.g., product name: Advanced Alumina produced by Sumitomo Chemical Co., Ltd.) as an aluminum supply source and without adding a flux, the produced $CeMgAl_{11}O_{19}$: $Tb^3$ trivalent rare earth ion-containing aluminate phosphor does not reflect the shape of the α-alumina powder and the shape thereof is irregular (FIG. 6($c$)).

As shown in FIG. 6($d$), a $CeMgAl_{11}O_{19}$: $Tb^{3+}$ green phosphor having a shape reflecting the shape of the α-alumina powder can be obtained at a firing temperature of 1600° C. However, at this temperature, the luminance level is less than 80% of that of the commercially available phosphor, as shown in FIG. 5.

It is reported that such a problem is not caused when a divalent rare earth ion-containing aluminate phosphor such as one expressed by chemical formula $BaMgAl_{10}O_{17}$: $Eu^{2+}$ is produced (the proceedings of the 270th Phosphor Conference of Phosphor Society, pp. 1 to 8). The above problem is peculiar to the trivalent rare earth ion-containing aluminate phosphor.

Furthermore, the method of heating a phosphor raw material obtained by vacuum drying of the frozen body of the phosphor raw material solution or spray pyrolysis of the colloidal solution cannot avoid the above problem that the grain shape of the $CeMgAl_{11}O_{19}$: $Tb^{3+}$ green phosphor that has been fired at a high temperature is non-uniform and irregular.

SUMMARY OF THE INVENTION

Therefore, with the foregoing in mind, it is an object of the present invention to provide a method for producing a trivalent rare earth ion-containing aluminate phosphor having a grain shape and grain size derived from the phosphor raw material and also having high luminescence performance. It is another object of the present invention to provide a trivalent rare earth ion-containing aluminate phosphor having a controlled grain shape and size by using such a method.

In order to achieve the above objects, one embodiment of the present invention provides a method for producing a trivalent rare earth ion-containing aluminate phosphor including heating a phosphor raw material comprising a granular substance containing aluminum in an oxidizing atmosphere at a predetermined temperature so as to produce an intermediate phosphor; and heating the intermediate phosphor in a reducing atmosphere at a temperature not more than the predetermined temperature.

The method makes it possible to produce a trivalent rare earth ion-containing aluminate phosphor having a grain shape and grain size derived from the granular substance contained in the phosphor raw material and improved luminescence performance. The predetermined temperature preferably is selected from the range from 1500° C. to 1900° C.

In this specification, a phosphor comprising a trivalent rare earth ion (Sc, Y, La, Ce, Pr, Nd, Pm, Sm, Eu, Gd, Tb, Dy, Ho, Er, Tm, Yb, and Lu), aluminum and oxygen is defined as a trivalent rare earth ion-containing aluminate phosphor. This phosphor includes, for example an oxynitride phosphor such as $CeAl_{12}O_{18}N$: $Tb^{3+}$. Furthermore, the present invention is effective also for a phosphor where a trivalent rare earth ion is added to a divalent europium activated phosphor as a coactivator, such as $SrAl_2O_4$:$Eu^{2+}$, $Dy^{3+}$ and $CaAl_2O_4$:$Eu^{2+}$, $Nd^{3+}$, although the effectiveness is not so high as for the above-described phosphor where the rare earth ions are contained as trivalent ions. Herein, the trivalent rare earth ion-containing aluminate phosphor includes a phosphor containing trivalent rare earth ions as a coactivator.

It is not necessary to supply all the phosphor raw material in the form of a granular substance. However, at least a granular substance containing aluminum is used as a part of the phosphor raw material. This granular substance can be in the form of a granular compound containing aluminum that supplies aluminum, and supplied together with other raw materials that supply other elements such as rare earth elements. Furthermore, as the granular substance, a granular phosphor raw material previously prepared by vacuum-drying of a frozen body of a phosphor raw material solution or spray pyrolysis of a colloidal solution can be used. In this case, elements such as rare earth elements have been contained in the granular phosphor raw material.

It is preferable that the phosphor raw material is substantially free from a flux (reaction accelerator). Examples of the flux include various types of halogenides and various types of boron compounds.

It is preferable that the granular substance is α-alumina powder, and more preferably, the α-alumina powder has substantially no fractured plane. Herein, "having no fractured plane" means that there is no plane generated by a fracture due to an external stress applied during a cracking process or the like. Preferably, the surface of each of the grains (e.g., a polyhedron) constituting the powder is a crystal growth plane.

It is preferable that the trivalent rare earth ion-containing aluminate phosphor includes a compound expressed by $(Ce_{1-x}L_x)(Mg_{1-y}Mn_y)Al_{11}O_{19}$ as a main compound, where L is at least one element selected from the group consisting of Sc, Y, and elements belonging to the lanthanoid series, and x and y are values satisfying $0 \leq x < 1$ and $0 \leq y < 1$, respectively. The lanthanoids, La, Pr, Gd, Eu, Dy and Tb are preferable, with Tb being the most preferable.

It is preferable that the intermediate phosphor comprises grains having substantially the same grain shape as that of the granular substance contained in the phosphor raw material. Herein, "having the same grain shape" includes a similar configuration.

It is preferable that the intermediate phosphor is a grain cluster having a median grain size not less than the median grain size of the granular substance contained in the phosphor raw material and less than twice the median grain size thereof. Herein, the median grain size (mean grain size) refers to a grain size at the point where, with respect to the grain cluster having a predetermined grain size distribution, the cumulative number of grains counted based on the grain size distribution has reached 50% of the total number.

More specifically, it is preferable that the intermediate phosphor is a grain cluster having a median grain size of at least 0.4 μm and not more than 20 μm, more preferably at least 1gm and not more than 10 μm.

More specifically, it is preferable that the intermediate phosphor is a grain cluster having a grain size concentration degree of at least 0.4 and not more than 1.0, more preferably at least 0.6 and not more than 1.0. Herein, "grain size concentration degree" is defined by the maximum of x satisfying $xA \leq d(n) \leq A/x$, where $d(n)$ is the grain size of each of n grains, and A is the median grain size of the grains. In this specification, the grain size concentration degree is determined by the results of observing each grain through a scanning electron microscope. It is appropriate to measure about 50 grains that are selected arbitrarily from a grain cluster. Also, the grain spherical degree, which is described below, is determined by the results of observing each grain through a scanning electron microscope.

More specifically, it is preferable that the intermediate phosphor is based on grains having a grain spherical degree of at least 0.5 and not more than 1.0, more preferably at least 0.7 and not more than 1.0. Herein, "grain spherical degree" is defined by y/x, where x is the maximum of the length of a line segment connecting a point a on the surface of a grain and another point b on the surface of the grain, and y is the minimum of the length of a line segment connecting a point c and a point d, where c and dare points where the perpendicular bisector of the line segment defined by the points a and b crosses the surface of the grain.

As in the case of the intermediate phosphor, it is preferable that the ultimately obtained phosphor has substantially the same grain shape as that of the granular substance contained in the phosphor raw material. It is preferable that the ultimately obtained phosphor is a grain cluster having a median grain size not less than the median grain size of the granular substance contained in the phosphor raw material and less than twice the median grain size thereof. The median grain size of the ultimately obtained phosphor preferably is at least 0.4 μm and not more than 20 μm, more preferably at least 1 μm and not more than 10 μm. Moreover, it is preferable that the ultimately obtained phosphor is a grain cluster having a grain size concentration degree of at least 0.4 and not more than 1.0, more preferably at least 0.6 and not more than 1.0. Furthermore, it is preferable that the ultimately obtained phosphor is based on grains having a grain spherical degree of at least 0.5 and not more than 1.0, more preferably at least 0.7 and not more than 1.0.

As described above with reference to the grain spherical degree, the shape of the phosphor obtained by the present invention preferably is spherical or pseudo-spherical (substantially spherical). However, it is not limited thereto and may be plate-like, a regular octahedron, columnar or the like.

According to another aspect of the present invention, a method for a trivalent rare earth ion-containing aluminate phosphor includes heating a phosphor raw material comprising a granular substance containing aluminum in an oxidizing atmosphere so as to produce an intermediate phosphor; and heating the intermediate phosphor in a reducing atmosphere, wherein the intermediate phosphor is substantially the same as the granular substance (preferably, trivalent rare earth ion-containing aluminate intermediate phosphor), and the method produces a trivalent rare earth ion-containing aluminate phosphor having substantially the same shape and /or grain size as those of this intermediate phosphor.

Another aspect of the present invention is a method for producing a trivalent rare earth ion-containing aluminate phosphor by heating the phosphor raw material in an oxidizing atmosphere at a temperature at least 1500° C. and not more than 1900° C., and further heating the same in a reducing atmosphere at a temperature at least 1400° C. and not more than 1800° C. The grain shape and the grain size are controlled by the phosphor raw material without using a flux, which also is one feature of one embodiment of the present invention.

Thus, the present invention provides a phosphor having a shape (grain size) reflecting the shape (grain size) of the granular substance containing aluminum. On the other hand, the phosphor is heated in an oxidizing atmosphere beforehand, so that it is unnecessary to heat in a reducing atmosphere at a high temperature to the extend that the shape of the granular substance containing aluminum is not reflected. In other words, heating in an oxidizing atmosphere compensates for the characteristics obtained by firing at a high temperature, such as the luminance property, of the phosphor. Thus, the present invention provides, for example, a spherical or pseudo-spherical trivalent rare earth ion-containing aluminate phosphor having a substantially uniform grain size and high luminance. This phosphor has improved heat deterioration resistance characteristics and suppresses temporal changes in the color of emitted light during illumination, as described above.

Heating is performed in an oxidizing atmosphere at a temperature at least 1500° C. and not more than 1900° C. It is not necessary to perform heating in a reducing atmosphere at a temperature so high as that for the heating in an oxidizing atmosphere. The heating temperature at a reducing atmosphere preferably is at least 1400° C. and not more than 1800° C. The heating in an oxidizing atmosphere causes tetravalent ions to be present in the phosphor, although its amount is small. However, these rare earth elements are reduced to be trivalent by heating in a reducing atmosphere and contribute to the color emission of the phosphor.

In view of practically desired characteristics, practical heating temperatures applicable to the production process and others, in an embodiment of the present invention, the heating temperature in an oxidizing atmosphere is equal to or more than the heating temperature in a reducing atmosphere, as described above.

In the process of heating in a reducing atmosphere, there is a tendency that the shape (grain size) of the granular substance is not reflected so exactly as in the process of heating in an oxidizing atmosphere. However, for example, if the shape of a pseudo-spherical phosphor is obtained from a spherical granular substance, the object of the present invention can be achieved. In particular, the most important shape of the phosphor is a spherical or pseudo-spherical shape that improves the characteristics of the phosphor or the light emitting device.

In the case where the intermediate phosphor is obtained in the form of aggregated grains in the method of the present invention, it is preferable to perform the process of cracking the aggregated intermediate phosphor before heating the intermediate phosphor. When the cracking process is performed, the grains are separated so that the grain size concentration degree or the grain spherical degree as described above can be determined precisely.

In the method of the present invention, it is preferable that the intermediate phosphor is a trivalent rare earth ion-containing aluminate compound, and more preferably a trivalent rare earth ion-containing aluminate compound in a substantially single crystal phase.

Furthermore, in the method of the present invention, unlike the relationship between the conventional preliminary firing and main firing, the heating temperatures are selected so that the heating temperature in a reducing atmosphere is not more than the heating temperature in an oxidizing atmosphere, preferably less than the heating temperature in an oxidizing atmosphere.

Furthermore, in the method of the present invention, it is preferable to perform heating in an oxidizing atmosphere and/or a reducing atmosphere two or more times separately.

As described above, the present invention can provide a granular trivalent rare earth ion-containing aluminate phosphor obtained by either one of the above-described methods, preferably obtained from the phosphor raw material containing no flux. The trivalent rare earth ion-containing aluminate phosphor has a spherical or pseudo-spherical shape. It is preferable that this phosphor has substantially the same shape as a granular substance containing aluminum contained in the phosphor raw material. Furthermore, it is preferable that the intermediate phosphor has a median grain size, a grain size concentration degree, a grain spherical degree in the ranges described above.

Furthermore, the present invention can provide a trivalent rare earth ion-containing aluminate phosphor, which is based on a compound expressed by $(Ce_{1-x}L_x)(Mg_{1-y}Mn_y)Al_{11}O_{19}$, where L is at least one element selected from the group consisting of Sc, Y, and elements belonging to the lanthanoid series, and x and y are values satisfying $0 \leq x < 1$ and $0 \leq y < 1$, respectively. The ratio of the luminescence intensity at the wavelength of 380 nm to the luminescence intensity at the wavelength of 542 nm in the photoluminescence obtained by ultraviolet rays inradiation at the wavelength 253.7 nm is not more than 0.020. The grain size concentration degree is not less than 0.4. It is preferable that L comprises at least Tb. It is preferable that x and y are values satisfying $0 \leq x \leq 0.5$ and $0 \leq y \leq 0.5$.

It is preferable that the grain spherical degree is at least 0.5 and not more than 1.0.

It is preferable that the compound obtained by the present invention is $(Ce_{1-x-z}Tb_zL'_x)(Mg_{1-y}Mn_y) Al_{11}O_{19}$, where L' is the above-listed L except Tb, x and y are the same as above, and z is a value satisfying $0 \leq z \leq 0.5$, preferably $0.25 \leq z \leq 0.5$.

A specific example of the compound is $(Ce_{1-x-z}Tb_zL'_x)MgAl_{11}O_{19}$. Another specific example of the compound is $(Ce_{1-z}Tb_z)MgAl_{11}O_{19}$.

It is especially preferable that L' is at least one element selected from the group consisting of Sc, La and Gd.

Furthermore, the present invention can provide a light emitting device such as a fluorescent lamp having improved characteristics by using the above-described trivalent rare earth ion-containing aluminate phosphor.

As described above, according to the present invention, a phosphor is obtained by heating a phosphor raw material in an an oxidizing atmosphere beforehand to produce an intermediate phosphor and heating the intermediate phosphor in a reducing atmosphere at a temperature not more than that for the heating in the oxidizing atmosphere. Therefore, the present invention provides a trivalent rare earth ion-containing aluminate phosphor, especially, a spherical or pseudo-spherical trivalent rare earth ion-containing aluminate phosphor, having a grain shape and grain size derived from the phosphor raw material and excellent luminescence performance. Thus, the present invention solves the problems peculiar to the trivalent rare earth ion-containing aluminate phosphor and provides very high utility value in the technical field to which the present invention belongs.

These and other advantages of the present invention will become apparent to those skilled in the art upon reading and understanding the following detailed description with reference to the accompanying figures.

DESCRIPTION OF THE PREFERRED EMBODIMENTS

Figure 1:
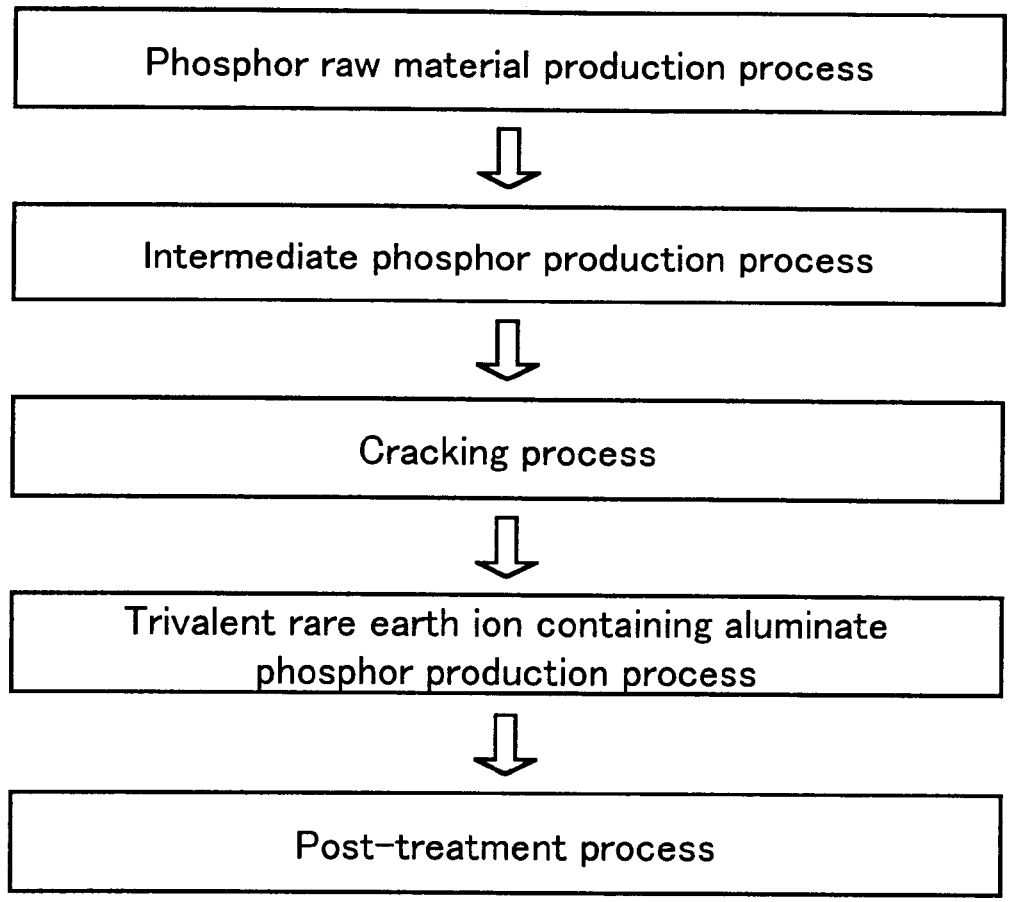
FIG. 1 is a flowchart showing an embodiment of a method for producing a trivalent rare earth ion-containing aluminate phosphor of the present invention.

Hereinafter, preferred embodiments of the method of the present invention will be described. FIG. 1 is a flowchart of a preferred embodiment of the present invention.

First, in a process for producing a phosphor raw material, raw material compounds are mixed in a predetermined element ratio so as to prepare a phosphor raw material.

Examples of the raw material compounds used include a cerium compound (cerium oxide, cerium carbonate, cerium nitrate, cerium oxalate or the like), a terbium compound (terbium oxide, terbium carbonate, terbium nitrate, terbium oxalate or the like), an yttrium compound (yttrium oxide, yttrium carbonate, yttrium nitrate, yttrium oxalate or the like), a magnesium compound (magnesium oxide, magnesium carbonate, basic magnesium carbonate, magnesium nitrate, magnesium oxalate or the like), a manganese compound (manganese carbonate, manganese metal or the like), an aluminum compound (aluminum oxide, aluminum hydroxide, aluminum nitrate or the like), a rare earth compound other than cerium, terbium and yttrium (oxides such as scandium oxide, lanthanum oxide, praseodymium oxide and gadolinium oxide, nitrates, oxalates, for example), a mixture thereof or a composite (yttrium terbium nitrate, cesium terbium oxalate or the like). The raw material compound can be an organic compound.

A granular aluminum compound for a raw material can be selected suitably in view of a preferable grain shape or grain size of an intermediate phosphor or the like, but more specifically, an alumina powder is preferable. Examples of such an alumina power include spherical alumina fine powder (e.g., product name: Alumina Beads produced by Showa Denko) and a platy alumina powder (a platy alumina powder body made by YKK). Furthermore, a preferable alumina powder is an α-alumina power (product name: Advanced Alumina produced by Sumitomo Chemical Co., Ltd.) (see "Sumitomo Chemical" by Masahide MOHRI et al, 1996-II, pp. 4 to 14 with respect to "Advanced Alumina").

Advanced Alumina described above is a α-alumina powder produced by a local vapor reaction called "In situ Chemical Vapor Deposition" in which raw material and reaction fields are substantially in the same place, and has the following characteristics.

1. single crystal α-alumina powder.
2. powder with no aggregation, having a state close to monodispersion.
3. powder whose grain size is controlled precisely.
4. The grain is a polyhedron and the surface thereof is not a fractured plane, but a crystal growth plane.
5. powder without defects observed, when the internal structure is evaluated with a super voltage transmission electron microscope.
6. powder having a sharp grain size distribution and a small amount of fine grains.

The aluminum compound preferably is an α-alumina powder. α-alumina is the most stable of the modifications of alumina and hardly changes when being heated.

These raw material compounds are mixed in a predetermined element ratio with a mixing machine such as a ball mill or an automatic mortar so as to prepare a phosphor raw material. The phosphor raw material can be prepared by dripping an aqueous solution comprising raw material compounds into a solution cooled to the freezing point or below in the form of droplets so as to produce a frozen body of a phosphor raw material solution and drying the frozen body in a vacuum or prepared by performing spray pyrolysis of a colloidal solution comprising an aluminum compound and a metal nitrate. Alternatively, the phosphor raw material can be prepared by dissolving a plurality of nitrates containing phosphor constituent elements in water, adding ammonium hydroxide to this solution to produce a precipitate, evaporating, drying and solidifying this precipitate and adding alumina powder thereto for mixture.

In a process for producing an intermediate phosphor, the phosphor raw material is fired in an oxidizing atmosphere so as to form an intermediate phosphor. The firing temperature preferably is in the range from 1500° C. to 1900° C. More preferably, the firing temperature is in the range from 1600° C. to 1700° C., and most preferably, in the range from 1650° C. to 1750° C. When the firing temperature in an oxidizing atmosphere is too low, it is difficult to obtain sufficient luminescence performance, or the grains aggregate so that the grain size (particle size) derived from the phosphor raw material is hardly obtained. On the other hand, when the firing temperature in an oxidizing atmosphere is too high, it is difficult to obtain a phosphor having a grain shape derived from the phosphor raw material.

In the above process, when firing is performed at a temperature of 1600° C. or more, the obtained intermediate phosphor can be a trivalent rare earth ion-containing aluminate phosphor in a signal crystal phase. However, when firing is performed at a temperature more than 1900° C., the intermediate phosphor may be molten. Herein, "a single crystal phase" means a substantially single phase, and a crystal in a single crystal phase includes a crystalline body where at least 90% is in a single crystal phase.

It is preferable that the heating process in an oxidizing atmosphere is performed in the air because of its convenience.

The heating process in an oxidizing atmosphere is performed before heating in a reducing atmosphere for the purpose of producing an intermediate phosphor having shape and size derived from the shape and the size of the granular substance and having good crystallinity, preferably of a single crystal or close to a single crystal. On the other hand, the conventional heating process at a low temperature (preliminary firing) is performed to activate the phosphor raw material so that the reactivity thereof becomes high.

In a cracking process, aggregated intermediate phosphors are cracked to be separated into individual grains. More specifically, the cracking process is constituted simply by cracking the intermediate phosphors with various cracking means (an automatic mortar, a cross-rotary mixer, a ball mill or the like).

In a process for producing a trivalent rare earth ion-containing aluminate phosphor, the intermediate phosphor is heated in a reducing atmosphere. More specifically, the cracked and separated intermediate phosphor is heated in a reducing atmosphere with an apparatus for producing a phosphor (atmosphere electric furnace or gas furnace). The heating temperature of the intermediate phosphor preferably is a temperature not higher than the heating temperature in an oxidizing atmosphere, more specifically, in the range from 1400° C. to 1800° C.

When the heating temperature in a reducing atmosphere is too low, it is difficult to obtain a trivalent rare earth ion-containing aluminate phosphor having sufficient luminescence performance. On the other hand, when the heating temperature in a reducing atmosphere is too high, it is difficult to obtain a phosphor having a grain shape derived from the phosphor raw material. From these viewpoints, the heating temperature in a reducing atmosphere preferably is at least 1500° C. and less than 1700° C.

It is preferable that the heating process in a reducing atmosphere is performed in a mixed gas of nitrogen and hydrogen because of its convenience.

Thus, a phosphor having a high luminescence and controlled grain shape and size, which are controlled by phosphor raw material, can be obtained.

In a post treatment process, processes associated with post treatments such as cracking, screening, classification, washing, and drying are suitably combined and performed.

Hereinafter, changes in the raw material in each process will be described in a greater detail.

In the process for producing an intermediate phosphor, when the phosphor raw material is fired in an oxidizing atmosphere (e.g., in the air), a chemical reaction is effected in the phosphor raw material, so as to provide an intermediate phosphor having a grain shape and grain size derived from the phosphor raw material, although the luminescence performance is poor. Furthermore, the intermediate phosphor can be a trivalent rare earth ion-containing aluminate phosphor in a substantially single crystal phase by optimizing the heating conditions.

It is believed that the reason why the intermediate phosphor is provided with a grain shape and grain size derived from the phosphor raw material, although the luminescence performance is poor, is that rare earth ions with a valence larger than trivalence (e.g., tetravalent terbium ions or tetravalent cerium ions) are present.

In other words, the luminescence of the trivalent rare earth ion-containing aluminate phosphor is effected by trivalent rare earth ions (trivalent cerium ions, trivalent terbium ions or the like). However, the intermediate phosphor obtained by heating the phosphor raw material in an oxidizing atmosphere comprises tetravalent rare earth ions (tetravalent terbium ions or tetravalent cerium ions), although its amount is small, in addition to trivalent ions. When the trivalent rare earth ion-containing aluminate phosphor comprises rare earth ions with a valence larger than trivalence, the luminescence intensity of the phosphor deteriorates. This is because the luminescence of the trivalent rare earth ion-containing aluminate phosphor is based on electron energy transition of trivalent rare earth ions.

On the other hand, crystals of the trivalent rare earth ion-containing aluminate phosphor exhibit good crystallinity when all the rare earth ions are trivalent, where the atoms are sufficiently well-arranged. In the first place, the crystal structure of the trivalent rare earth ion-containing aluminate phosphor is different from that of any one of the compounds constituting the phosphor raw material. However, when tetravalent rare earth ions are present, although its amount is small, these ions disturb the atomic arrangement. Therefore, the trivalent rare earth ion-containing aluminate phosphor tends to reflect the grain shape of the phosphor raw material rather than the structure different from the original structure of this phosphor.

For the reasons described above, when the phosphor raw material of the trivalent rare earth ion-containing aluminate phosphor is reacted in an oxidizing atmosphere, an intermediate phosphor having a grain shape and grain size derived from the phosphor raw material, although its luminescence performance is poor, can be obtained.

The inventors of the present invention confirmed that the luminance of the intermediate phosphor obtained by firing in an oxidizing atmosphere was 70 to 95% of that of the phosphor obtained by firing in a reducing atmosphere, when evaluated with the photoluminescence at ultraviolet ray irradiation at the wavelength of 254 (253.7)nm. However, when the phosphor raw material is heated only in a reducing atmosphere without being heated in an oxidizing atmosphere, the shape of the granular substance contained in the raw material started to collapse at 1200° C. to 1400° C., and the shape of the granular substance is not reflected at all at 1600° C.

In the cracking process, when the aggregated intermediate phosphors are cracked, grains separated from each other having a shape and size derived from the phosphor raw material can be obtained.

In the process for producing a trivalent rare earth ion-containing aluminate phosphor, the intermediate phosphor is heated in a reducing atmosphere so that its luminescence performance improves while the grain shape and the grain size are substantially maintained. Since the shape and the size are maintained, the characteristics such as the median grain size, the grain size concentration degree, the grain spherical degree or the like are substantially the same between the intermediate phosphor and the obtained phosphor.

On the other hand, the luminescence performance is improved by reducing the rare earth ions with a valence larger than trivalence (tetravalent terbium ions, tetravalent cerium ions or the like) contained in the intermediate phosphor to trivalent rare earth ions. However, since the intermediate phosphor is heated in a predetermined temperature range (e.g., a range of temperatures lower than the heating temperature in an oxidizing atmosphere), the movement of the atoms inside the intermediate phosphor is suppressed. Therefore, the grain shape derived from the phosphor raw material of the intermediate phosphor is maintained.

Thus, when the phosphor raw material of a trivalent rare earth ion-containing aluminate phosphor is heated in an oxidizing atmosphere to produce an intermediate phosphor, and the intermediate phosphor is heated in a reducing atmosphere at a temperature not higher than the heating temperature in the oxidizing atmosphere, a trivalent rare earth ion-containing aluminate phosphor having a grain shape and grain size derived from the phosphor raw material and excellent luminescence performance can be produced.

Furthermore, the use of a phosphor raw material (spherical granular alumina, or a spherical granular phosphor raw material obtained by vacuumdrying of the frozen body of the phosphor raw material solution or spray pyrolysis of the colloidal solution) having a spherical shape or a pseudo-spherical shape close to a sphere can provide a trivalent rare earth ion-containing aluminate phosphor having a spherical shape or a pseudo-spherical shape close to a sphere, leading to the effect of improving the transmission luminance and reflection luminance of the phosphor layer as described above, which results from the reflection of the shape of the phosphor raw material on the grain shape of the phosphor.

In the embodiment described above, the process for producing a phosphor raw material, the process for producing an intermediate phosphor, the cracking process, the process for producing a trivalent rare earth ion-containing aluminate phosphor, and the post-treatment process are combined in this order. However, the combination of the processes for producing a trivalent rare earth ion-containing aluminate phosphor of the present invention is not limited to the above combination.

Hereinafter, the luminance of the phosphor will be described in a greater detail. Here, a trivalent rare earth ion-containing aluminate phosphor that contains $Tb^{3+}$ in addition to $Ce^{3+}$ as trivalent rare earth elements and emits green light will be described.

When this phosphor is irradiated with ultraviolet rays (for example, a wavelength of 253.7 nm), the energy of the ultraviolet rays is absorbed by $Ce^{3+}$ and, in turn, the energy absorbed by $Ce^{3+}$ is absorbed by $Tb^{3+}$ so that $Tb:^{3+}$ emits green light (in the vicinity of the peak wavelength of 542 nm; green). In the case where the energy is not transferred to $Tb^{3+}$, $Ce^{3+}$ emits light (in the vicinity of the peak wavelength of 350 nm; violet blue).

In the case where the crystallinity of the phosphor is not sufficient, the defects in the phosphor inhibit the energy from transferring from $Ce^{3+}$ to $Tb^{3+}$. The degree of this inhibition can be evaluated by measuring the ratio of the luminescence intensity of $Ce^{3+}$ to the luminescence intensity of $Tb^{3+}$.

Figure 7:
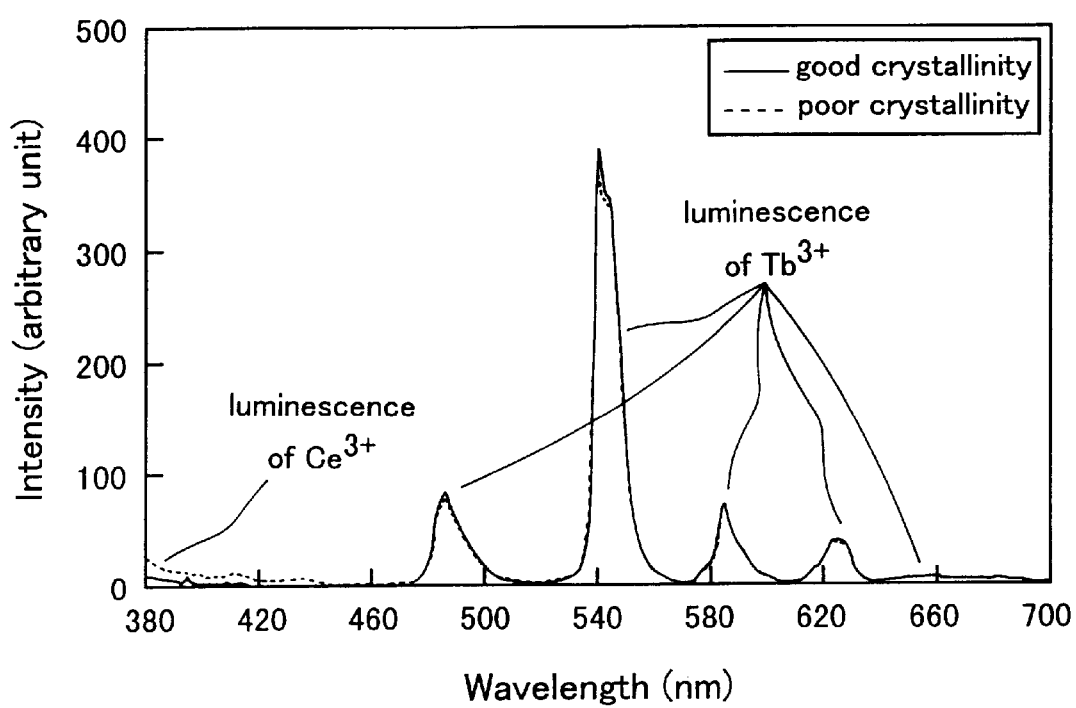
FIG. 7 is a graph showing an example of an optical spectrum of the phosphor of the present invention.

FIG. 7 is an example of an optical spectrum of the photoluminescence obtained by ultraviolet ray irradiation at a wavelength of 253.7 nm with respect to a phosphor having good crystallinity (solid line) and a phosphor having significant defects (broken line).

When the present invention is applied, as shown in the following example, a phosphor having good crystallinity where the transition of the energy is inhibited can be obtained, while the phosphor has a controlled shape and size, which are controlled by the granular substance contained in the raw material.

Hereinafter, preferred embodiments of a fluorescent lamp to which the present invention can be applied will be described with reference to the accompanying drawings.

Figure 8:
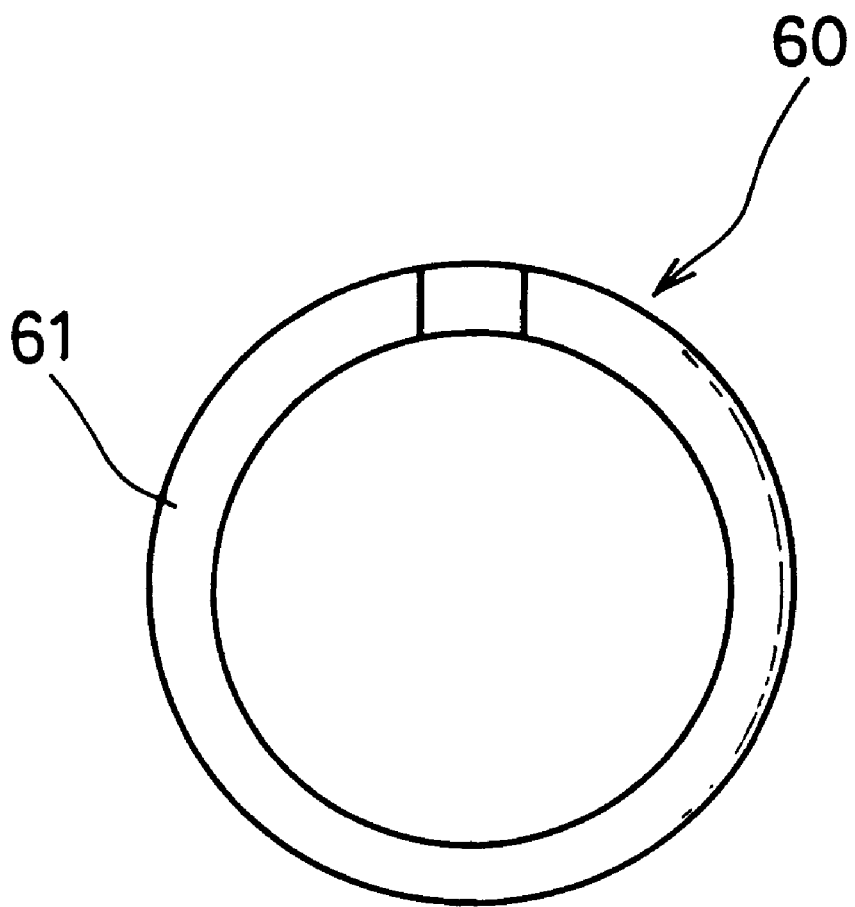
FIG. 8 is a plan view showing a circular fluorescent lamp as an example of a light emitting device of the present invention.
Figure 9:
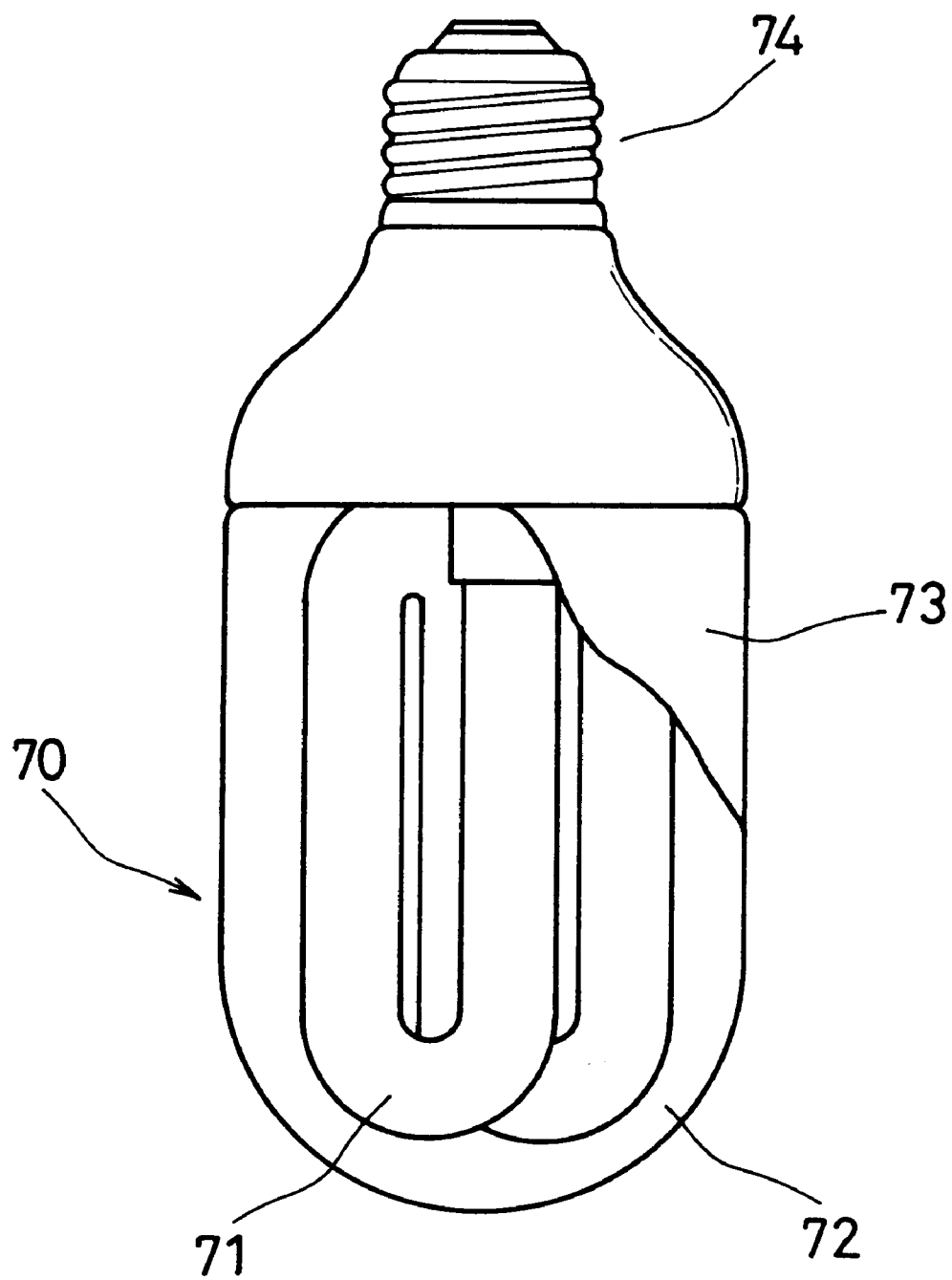
FIG. 9 is a partially sectional drawing showing a bulb-formed fluorescent lamp as an example of a light emitting device of the present invention.
Figure 10:
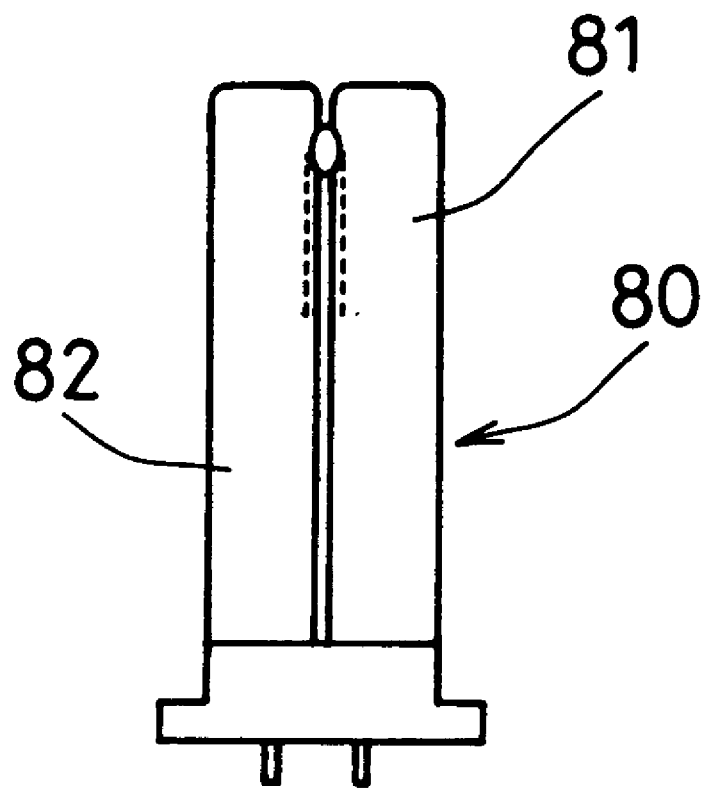
FIG. 10 is a plan view showing a twin fluorescent lamp as an example of a light emitting device of the present invention.

FIGS. 8, 9 and 10 show a circular fluorescent lamp, a bulb-formed fluorescent lamp, and a twin fluorescent lamp, respectively. In the circuit fluorescent lamp 60, a fluorescent lamp 61 is formed by bending a glass tube in a ring form so that the ends thereof are contacted. In the bulb-formed fluorescent lamp 70, a globe 73 coated with a light diffusion substance 72 covers a fluorescent lamp 71 that has been bent, and a lamp base 74 of the same type as an incandescent lamp is provided. In the twin fluorescent lamp 80, two fluorescent lamps 81 and 82 arranged in parallel are connected in the vicinity of the ends thereof.

The phosphor provided by the present invention is applicable not only to the fluorescent lamps as described above but also to various light emitting devices (plasma display, CRT (cathode ray-tube), FED (field emission display) or the like). The pseudo-spherical phosphor having a uniform grain size has a high bulk density. Therefore, the use of the phosphor of the present invention can make the density of the phosphor layer high. When the density of the phosphor layer is high, the luminous flux of the light emitting device can be raised. Furthermore, as described above, when the pseudo-spherical phosphor having a uniform grain size is used, the thermal degradation resistance characteristics of the phosphor can improve.

Example

Hereinafter, the present invention will be described by way of example more specifically. However, the following example is only illustrative and not limiting the present invention.

In this example, a green color luminescent trivalent rare earth ion-containing aluminate phosphor expressed by a chemical formula $Ce_{0.6}Tb_{0.4}MgAl_{11}O_{19}$ (hereinafter, referred to as "$CeMgAl_{11}O_{19}$: $Tb^{3+}$ phosphor") was produced.

In view of the transition of the energy from $Ce^{3+}$ to $Tb^{3+}$, the ratio of the number of Tb atoms to the number of (Ce+Tb) atoms is preferably at least 0.25 and not more than 0.5.

The raw material compounds for the $CeMgAl_{11}O_{19}$: $Tb^{3+}$ phosphor were cerium oxide (purity of 99.9%), terbium oxide (purity of 99.9%), basic magnesium carbonate (purity of 99.99%), and alumina (aluminum oxide: purity of 99.999%). A flux was not used.

As the aluminum oxide, "Advanced Alumina" produced by Sumitomo Chemical Co., Ltd. was used. When this α-alumina powder was observed through an electron microscope, no fractured plane was observed and it was found that the α-alumina powder was constituted by pseudo-spherical grains having a grain spherical degree of about 0.7 to 0.9, which is defined above. Furthermore, when the grain size distribution was measured, the median grain size was about 5 μm, and the grains had uniform grain sizes having a grain size concentration degree as defined above of about 0.41. The grain size distribution was measured with a laser micron sizer.

First, in the process for producing a phosphor raw material, 5.16 g of cerium oxide, 3.74 g of terbium oxide, 4.80 g of basic magnesium carbonate, and 28.05 g of aluminum oxide were mixed with an automatic mortar for one hour so as to provide a $CeMgAl_{11}O_{19}$: $Tb^{3+}$ phosphor raw material.

Next, in the process for producing an intermediate phosphor, the $CeMgAl_{11}O_{19}$: $Tb^{3+}$ phosphor raw material was charged to an alumina boat, and it was placed in a box type electric furnace for two hour firing in the air so as to provide a $CeMgAl_{11}O_{19}$: $Tb^{3+}$ intermediate phosphor. The firing temperature for this first firing was 1650° C.

Figure 2:
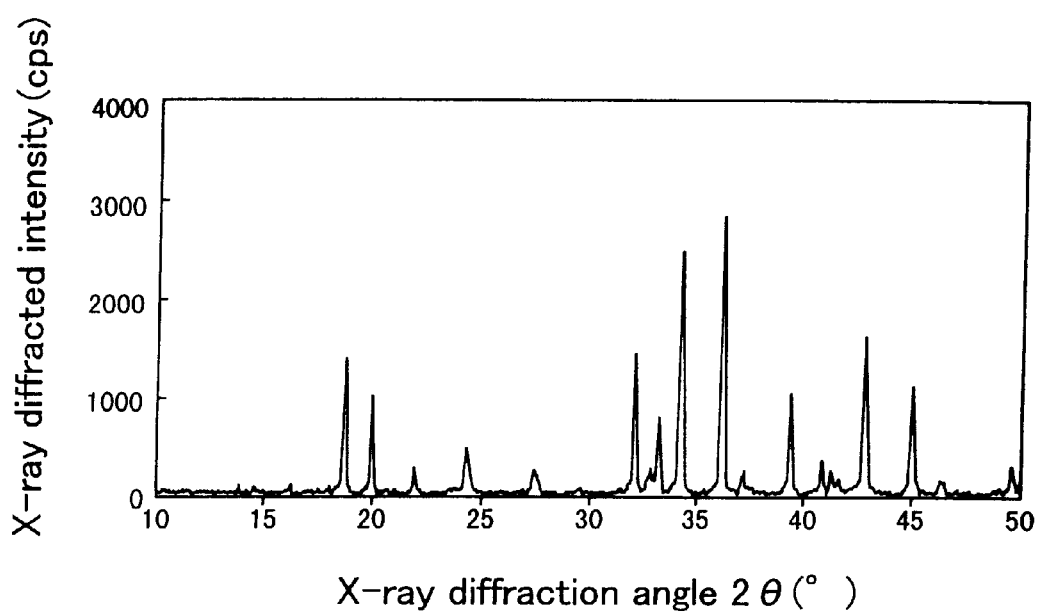
FIG. 2 is a X-ray diffraction pattern of an intermediate phosphor obtained in the examples of the present invention.

FIG. 2 shows the X-ray diffraction pattern of the $CeMgAl_{11}O_{19}$: $Tb^{3+}$ intermediate phosphor. FIG. 2 confirmed that this intermediate phosphor was a $Ce_{0.6}Tb_{0.4}MgAl_{11}O_{19}$ trivalent rare earth ion-containing aluminate compound in a single crystal phase.

Figure 3:
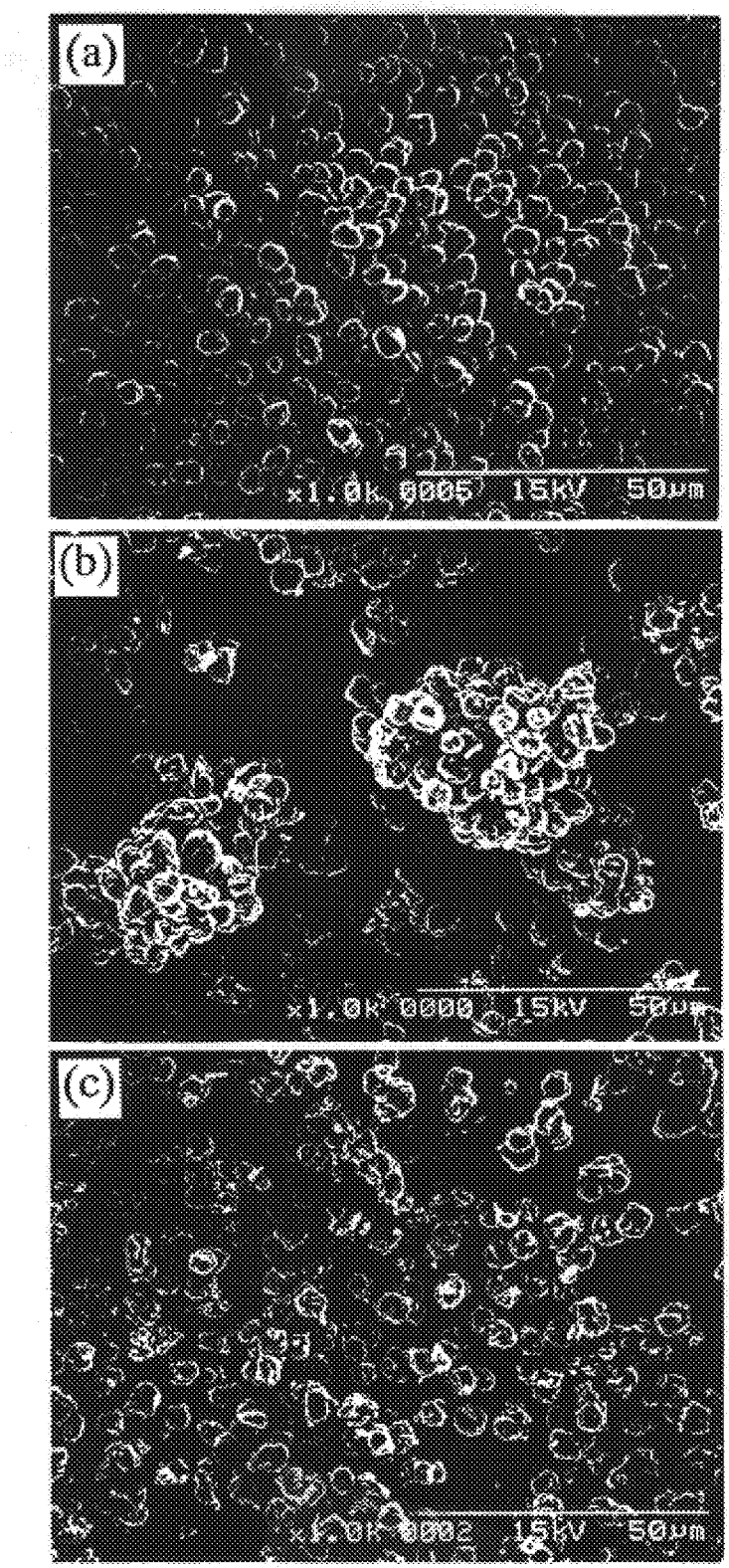
FIGS. 3(a) through 3(c) are electron micrographs of (a) an aluminum oxide used in the examples of the present invention, (b) an intermediate phosphor before a cracking treatment and (c) the intermediate phosphor after a cracking treatment obtained in the examples of the present invention.

Furthermore, in the cracking process, the $CeMgAl_{11}O_{19}$: $Tb^{3+}$ intermediate phosphor was subjected to a cracking treatment with an automatic mortar for 10 minutes. FIG. 3 shows the results of observing the aluminum oxide, which is a raw material (FIG. 3(a)), the $CeMgAl_{11}O_{19}$: $Tb^{3+}$ intermediate phosphor before the cracking treatment (FIG. 3(b)), and the $CeMgAl_{11}O_{19}$: $Tb^{3+}$ intermediate phosphor after the cracking treatment (FIG. 3(c)) through an electron microscope.

The comparison of FIGS. 3(a) and 3(c) reveals that the grain shape of the $CeMgAl_{11}O_{19}$: $Tb^{3+}$ intermediate phosphor after the cracking treatment is substantially the same as that of the aluminum oxide. The comparison of FIGS. 3(b) and 3(c) reveals that the grains of the $CeMgAl_{11}O_{19}$: $Tb^{3+}$ intermediate phosphor that were aggregated after the process for producing an intermediate phosphor were separated into individual grains by the cracking treatment.

Furthermore, the grain spherical degree and the grain size distribution of the $CeMgAl_{11}O_{19}$: $Tb^{3+}$ intermediate phosphor after the cracking treatment were measured in the same manner as in the case of the α-alumina powder used as a raw material. The grain spherical degree was 0.5 to 0.7, the grain concentration degree was 0.40 and the median grain size was 6.6 μm.

Figure 4:
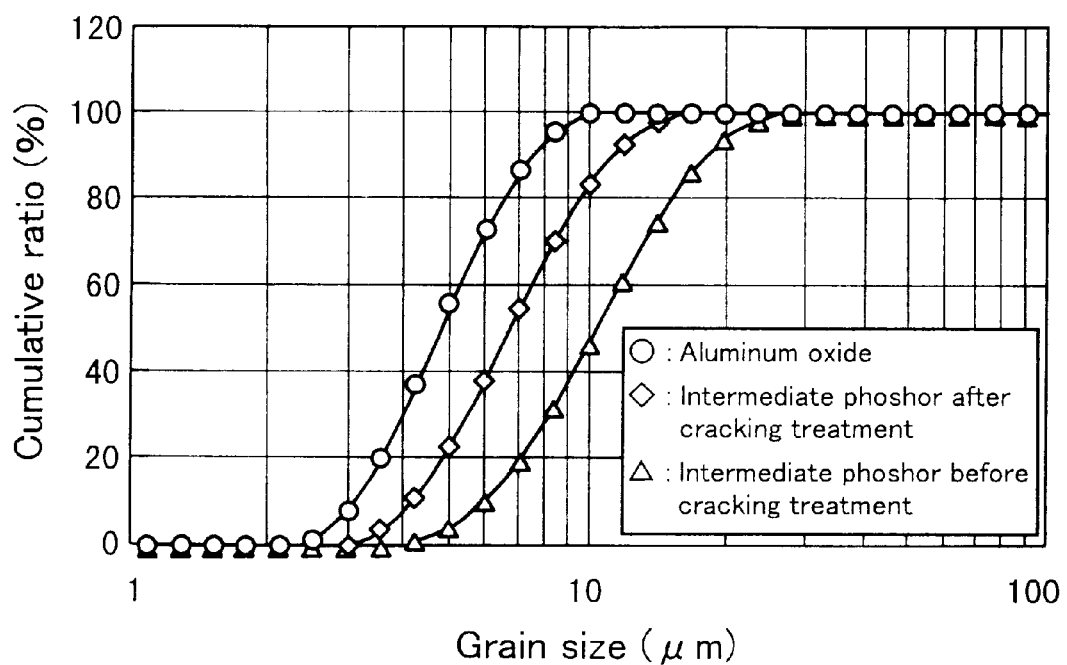
FIG. 4 is a graph showing a grain size distribution of the aluminum oxide used in the examples of the present invention, the intermediate phosphor before a cracking treatment and the intermediate phosphor after a cracking treatment obtained in the examples of the present invention.

FIG. 4 shows grain size distribution curves of the aluminum oxide used as a raw material, the $CeMgAl_{11}O_{19}$: $Tb^{3+}$ intermediate phosphor before the cracking treatment, and the $CeMgAl_{11}O_{19}$: $Tb^{3+}$ intermediate phosphor after the cracking treatment.

FIG. 4 confirms that the median grain size of the $CeMgAl_{11}O_{19}$: $Tb^{3+}$ intermediate phosphor after the cracking treatment is in the range of at least 100% and less than 200% of the median grain size of the aluminum oxide and that the median grain size of the $CeMgAl_{11}O_{19}$: $Tb^{3+}$ intermediate phosphor was reduced from about 10 μm to about 6.6 μm by the cracking treatment.

Furthermore, in the process for producing a trivalent rare earth ion-containing aluminate phosphor, the $CeMgAl_{11}O_{19}$: $Tb^{3+}$ intermediate phosphor after the cracking treatment was charged to an alumina boat, and it was placed in a tubular atmosphere furnace and fired in a reducing atmosphere of a mixed gas of nitrogen and hydrogen for two hours. The firing temperature for this second firing was 1600° C. The flow rates of the nitrogen and the hydrogen were 380 cc/min and 20 cc/min, respectively. In this example, the post-treatment process as described above was omitted.

The grain spherical degree and the grain size distribution of the thus obtained $CeMgAl_{11}O_{19}$: $Tb^{3+}$ phosphor (hereinafter, referred to as "the phosphor of the example") were measured in the same manner as in the case of the α-alumina powder used as a raw material. The grain spherical degree was 0.5 to 0.7, the grain concentration degree was 0.40 and the median grain size was 8.3 μm.

Furthermore, the luminance and the chromaticity of the phosphor of the example were evaluated with a luminance and chromaticity measuring apparatus. For the evaluation of the luminance and the chromaticity, a low pressure mercury lamp was used and $CeMgAl_{11}O_{19}$: $Tb^{3+}$ phosphor was irradiated with UV rays at the wavelength of 254 nm.

For comparison, a $CeMgAl_{11}O_{19}$: $Tb^{3+}$ phosphor was produced separately by a conventional method (without a flux) and evaluated in the same manner. More specifically, this phosphor was produced by omitting the process for intermediate phosphor and the cracking process in the above-described processes and firing a $CeMgAl_{11}O_{19}$: $Tb^{3+}$ phosphor raw material obtained in the process for producing a phosphor raw material in a mixed atmosphere of nitrogen and hydrogen at a predetermined temperature for two hours. The raw materials and apparatuses used were the same as above. Hereinafter, the phosphor obtained by firing at a temperature of 1600° C. is referred to as "comparative phosphor A", and the phosphor obtained by firing at a temperature of 1700° C. is referred to as "comparative phosphor B".

Furthermore, a commercially available $CeMgAl_{11}O_{19}$: $Tb^{3+}$ phosphor ("commercially available phosphor") was evaluated in the same manner. In the process for producing this phosphor, aluminum fluoride was used as a flux. Table 1 shows the results of the evaluation of the phosphors.

The ratio of the luminescence intensity was used as one measure for evaluation. This ratio of the luminescence intensity is a ratio of the luminescence intensity at the wavelength of 380 nm to the luminescence intensity at the wavelength of 542 nm at the photoluminescence obtained by ultraviolet rays irradiation at the wavelength of 253.7 nm.

TABLE 1

| $CeMgAl_{11}O_{19}$:$Tb^{3+}$ phosphor | Relative luminance (%) | Chromaticity (x,y) | Ratio of luminescence intensity |
| --- | --- | --- | --- |
| Phosphor of Example (produced via an intermediate phosphor) | 103 | (0.3235, 0.5950) | 0.016 |
| Comparative phosphor A (directly heated at 1600° C.) | 79 | (0.3179, 0.5862) | 0.046 |
| Comparative phosphor B (directiy heated at 1700° C.) | 90 | (0.3204, 0.5932) | 0.038 |
| Commercially available phosphor (a flux is used) | 100 | (0.3209, 0.5932) | 0.016 |

As shown in Table 1, the relative luminance of the phosphor of the example was higher than either of the two comparative phosphors and was slightly higher than that of the commercially available phosphor. Thus, the above method makes it possible to produce a $CeMgAl_{11}O_{19}$: $Tb^{3+}$ phosphor that has a higher luminance than that of a phosphor produced by a conventional method, at least as long as the chromaticity is regarded as the same, and has a 3% higher luminance than that of a phosphor produced using a flux.

Furthermore, the ratio of the luminescence intensity was suppressed to the extent that there is substantially no luminescence of $Ce^{3+}$ (not more than 0.020).

In this example, the $CeMgAl_{11}O_{19}$: $Tb^{3+}$ phosphor having a high luminance was obtained for the following reasons. It is believed that high temperature heating (1600° C.) in a reducing atmosphere eliminated the presence of tetravalent cerium ions or tetravalent terbium ions. In addition, it also is believed that heating at about 1600 to 1700° C. twice made it possible to produce a $CeMgAl_{11}O_{19}$: $Tb^{3+}$ phosphor having excellent crystal quality.

Figure 5:
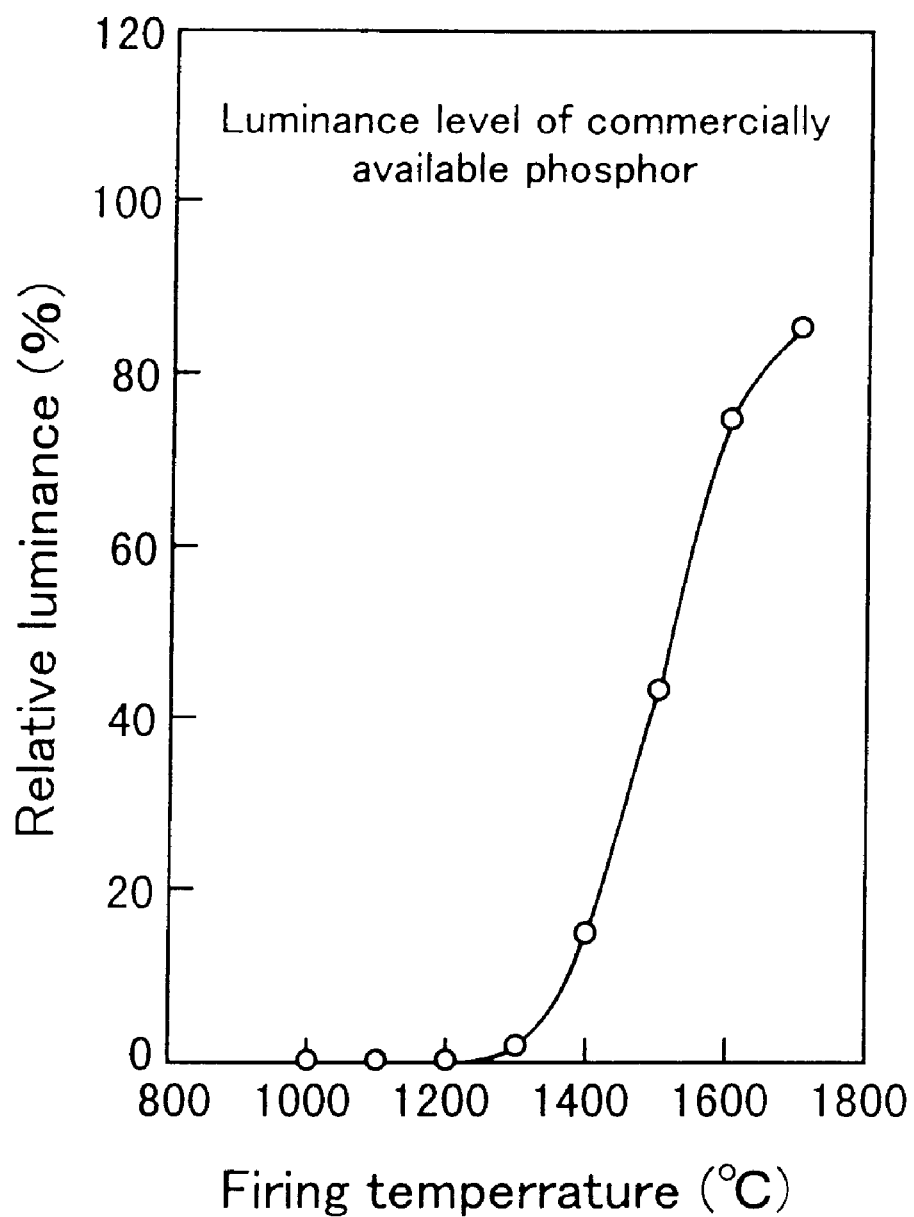
FIG. 5 is a graph showing the relationship between the firing temperature and the relative luminance of a $CeMgAl_{11}O_{19}$: $Tb^{3+}$ phosphor produced by a conventional method.

As partially described above, FIG. 5 is a graph showing the relationship between the firing temperature and the relative luminance of the $CeMgAl_{11}O_{19}$: $Tb^{3+}$ phosphor obtained by firing a phosphor raw material as it is in a reducing atmosphere, relative to the luminance of the $CeMgAl_{11}O_{19}$: $Tb^{3+}$ commercially available phosphor produced by using a flux, which is expressed by 100. In the method of heating in a reducing atmosphere directly, when the firing temperature is raised, a higher luminance can be obtained. However, in order to obtain a high luminance comparable to the $CeMgAl_{11}O_{19}$: $Tb^{3+}$ commercially available phosphor, it is necessary to raise the firing temperature to 1700° C. or more, so that the phosphor cannot have a grain shape reflecting the grain shape of the phosphor raw material.

As partially described above, FIGS. 6(a) through 6(e) are electron micrographs of an aluminum oxide used as a raw material (FIG. 6(a)), the phosphor of the example (FIG. 6(b)), the comparative phosphor B (FIG. 6(c)), the comparative phosphor A (FIG. 6(d)), and the commercially available phosphor (FIG. 6(e)). The comparison of FIGS. 6(a) and 6(b) reveals that the grain shape of the phosphor of the example produced via the intermediate phosphor is substantially the same as that of the aluminum oxide used as a raw material, which is a pseudo-spherical shape close to a sphere, and that the grain size distribution is substantially the same as that of the aluminum oxide used as a raw material, which is a uniform grain size distribution. Furthermore, FIG. 6(b) reveals that the grain of the phosphor of the example of the present invention is characterized in that multiple plate-like crystals are superimposed on each other so as to form a pseudo-spherical shape close to a sphere. On the other hand, the comparative phosphor A (FIG. 6(d)) obtained by firing at a temperature of 1600° C. has a pseudo-spherical shape, which is substantially the same as that of the aluminum oxide, whereas the comparative phosphor B (FIG. 6(c)) obtained by firing at a temperature of 1700° C. has a non-uniform and irregular shape, which does not reflect the grain shape of the aluminum oxide at all. Furthermore, the phosphor produced using a flux (FIG. 6(e)) has a non-uniform grain size. The grain shape thereof is a hexagonal plate with slightly rounded corners.

Figure 6:
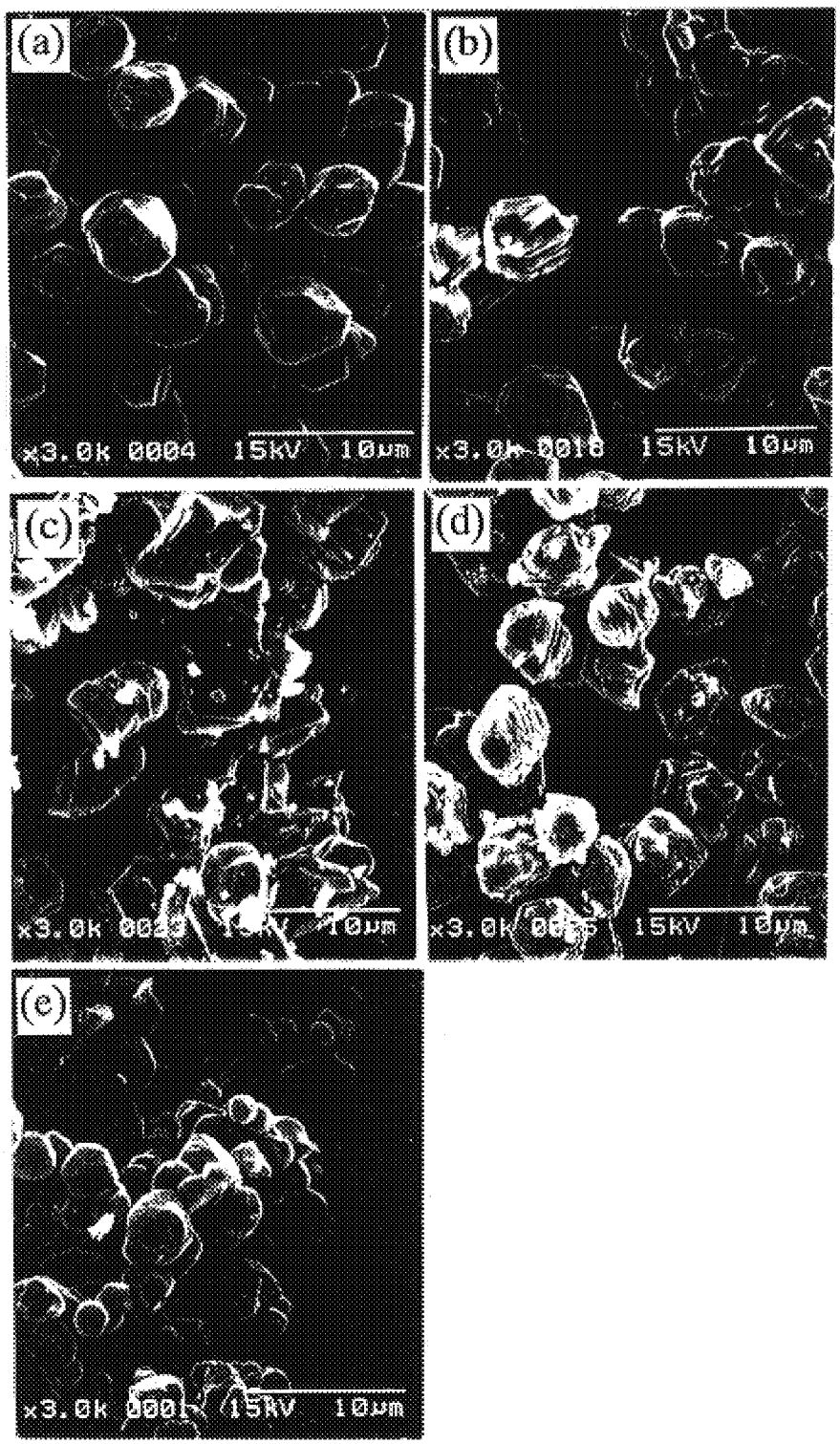
FIGS. 6(a) through 6(e) are electron micrographs of (a) an aluminum oxide used in the examples of the present invention, (b) a trivalent rare earth ion-containing aluminate phosphor obtained in the examples of the present invention, (c) a first comparative phosphor (firing temperature: 1700° C.) and (d) a second comparative phosphor (firing temperature: 1600° C.) produced by a conventional method, and (e) the commercially available phosphor.

The phosphor of the example has such an appearance that thin crystals are laminated (FIG. 6(b)). Thus, in an embodiment of the present invention, a phosphor having a pseudo-spherical shape and a layered structure can be obtained. On the other hand, when a flux is added, the phosphor can have a smooth surface (FIG. 6(e)). The difference in the appearance of the phosphor between the presence and the absence of the flux can be confirmed easily by observation through an electron microscope.

The grain spherical degrees and the grain size distributions of the comparative phosphor B and the commercially available phosphor were measured in the same manner as described above. For the comparative phosphor B, the grain spherical degree was 0.3 to 0.8, the grain concentration degree was 0.2 and the median grain size was 11.3 μm. For the commercially available phosphor, the grain spherical degree was 0.4 to 0.8, the grain concentration degree was 0.36 and the median grain size was 8.3 μm.

Thus, the present invention makes it possible to produce a pseudo-spherical trivalent rare earth ion-containing aluminate phosphor that has a controlled grain size and shape and high luminescence performance.

This example used a phosphor raw material containing a granular α-alumina raw material having substantially no fractured plane. However, the method of the present invention is applicable to a wide range of methods using a phosphor raw material containing a granular aluminum compound having a shape other than that.

The same function and effect can be provided also by the method of the present invention using a granular phosphor raw material prepared by dripping an aqueous solution mixed with raw material compounds that can constitute the phosphor raw material into a solution cooled to the freezing point or below so as to produce a frozen body of a phosphor raw material solution, and then drying the frozen body in a vacuum, or performing spray-pyrolysis of a colloidal solution containing an aluminum compound and a metal nitrate or the like.

In this example, the $CeMgAl_{11}O_{19}$: $Tb^{3+}$ phosphor was described. However, the method of the present invention is applicable widely to a trivalent rare earth ion-containing phosphor.

For example, a green phosphor having the same characteristics can be produced even by substituting Sc for 0 to 30% of Ce or Tb in the above compound. For example, this substituted compound can be expressed by $(Ce_{1-x}Tb_x)_{1-p}M_p(Mg_{1-y}Mn_y)Al_{11}O_{19}$, where M is at least one compound selected from the group consisting of Sc, Y, and elements belonging to the lanthanoid series except Tb (preferably at least one element selected from the group consisting of Sc, Y, La, and Gd), and x, y, and p are values satisfying $0 \leq x < 1$, $0 \leq y < 1$ and $0 \leq p < 0.3$.

When a part of Ce or Tb is replaced by the element M such as Sc, the following effects can be provided. (1) Since these elements have a different ion radius from that of Ce or Tb, the lattice constant of crystals of the phosphor increases or decreases slightly, whereby the excitation efficiency of $Ce^{3+}$ or $Tb^{3+}$ ions with respect to UV rays at a specific wavelength (e.g., 253.7 nm) increases or decreases to a small extent. (2) The melting point of the trivalent rare earth ion-containing aluminate phosphor increases or decreases slightly, whereby the crystallinity of the phosphor produced under specific production conditions can be changed to a small extent.

If these effects are utilized, the relative luminance of the green phosphor based on the compound expressed by a chemical formula $Ce_{0.6}Tb_{0.4}MgAl_{11}O_{19}$ can be controlled in a range of 90 to 105% of the luminance of the $CeMgAl_{11}O_{19}$: $Tb^{3+}$ green phosphor, which is expressed by 100%.

The absolute value of the luminance varies with the production conditions (firing atmosphere, firing temperature, firing duration, the number of times of firing or the like) of the trivalent rare earth ion-containing aluminate phosphor.

The same effect as that of the above-described example can be obtained with an aluminate phosphor such as Ce(III)

$MgAl_{11}O_{19}$, $Ce(III)MgA_{11}O_{19}$: $Mn^{2+}$, $CeMgAl_{11}O_{19}$: $Tb^{3+}$, $Mn^{2+}$, or the like, a trivalent rare earth ion-containing aluminate phosphor expressed by a chemical formula phosphor $Y_3Al_5O_{12}$: $Tb^{3+}$, or $Y_3Al_5O_{12}$: $Ce^{3+}$, or an oxynitride such as $CeAl_{12}O_{18}N$: $Tb^{3+}$, as long as the method of the present invention is used.

In the case where the trivalent rare earth ion-containing aluminate phosphor was produced by a conventional method, the evaluation of the crystal constituents by X ray diffraction confirmed that a trivalent rare earth ion-containing aluminate compound such as $CeAlO_3$, $TbAlO_3$ or $YAlO$, which hardly maintains the grain shape or grain size derived from the phosphor raw material, tends to be produced as the intermediate product.

In the above example, firing in an oxidizing atmosphere and firing in a reducing atmosphere were performed once each. However, higher luminescence performance can be obtained with increasing the number of times of firing, as long as the intermediate phosphor and the trivalent rare earth ion-containing aluminate phosphor maintain the grain shape derived from the phosphor raw material. However, in the case where the heating process is performed a plurality of times, it is necessary to take care especially not to mix impurities.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for producing a trivalent rare earth ion-containing aluminate phosphor comprising:

heating a phosphor raw material comprising a granular substance containing aluminum in an oxidizing atmosphere at a first temperature so as to produce an intermediate phosphor; and heating the intermediate phosphor in a reducing atmosphere at a second temperature not more than the first temperature, wherein the second temperature ranges from 1400 to 1800° C.

2. The method for producing a trivalent rare earth ion-containing aluminate phosphor according to claim 1, wherein the granular substance containing aluminum is a granular compound containing aluminum.

3. The method for producing a trivalent rare earth ion-containing aluminate phosphor according to claim 1, wherein the phosphor raw material is substantially free from a flux.

4. The method for producing a trivalent rare earth ion-containing aluminate phosphor according to claim 1, wherein the granular substance is α-alumina powder.

5. The method for producing a trivalent rare earth ion-containing aluminate phosphor according to claim 4, wherein the α-alumina powder has substantially no fractured plane.

6. The method for producing a trivalent rare earth ion-containing aluminate phosphor according to claim 1, wherein the trivalent rare earth ion-containing aluminate phosphor includes a compound expressed by $(Ce_{1-x}L_x)(Mg_{1-y}Mn_y)Al_{11}O_{19}$ as a main compound, where L is at least one element selected from the group consisting of Sc, Y and elements belonging to the lanthanoid series, and x and y are values satisfying $0 \leq x < 1$ and $0 \leq y < 1$, respectively.

7. The method for producing a trivalent rare earth ion-containing aluminate phosphor according to claim 6, wherein L comprises Tb.

8. The method for producing a trivalent rare earth ion-containing aluminate phosphor according to claim 1, wherein the heating temperature in an oxidizing atmosphere is at least 1500° C. and not more than 1900° C.

9. A trivalent rare earth ion-containing aluminate phosphor, which is a granular trivalent rare earth ion-containing aluminate phosphor produced by a method comprising heating a phosphor raw material comprising a granular substance containing aluminum in an oxidizing atmosphere at a first temperature so as to produce an intermediate phosphor; and heating the intermediate phosphor in a reducing atmosphere at a second temperature not more that the first temperature, wherein the trivalent rare earth ion-containing aluminate phosphor has a spherical or psuedo-spherical shape.

10. The trivalent rare earth ion-containing aluminate phosphor according to claim 9, wherein the phosphor raw material is substantially free from a flux.

11. A light emitting device using the phosphor according to claim 9.

12. A trivalent rare earth ion-containing phosphor according to claim 9, wherein the first temperature ranges from 1500 to 1900° C.

13. A trivalent rare earth ion-containing aluminate phosphor according to claim 9, wherein the second temperature ranges from 1400 to 1800° C.

14. A trivalent rare earth ion-containing aluminate phosphor according to claim 9, wherein the aluminate phosphor is based on a compound expressed by $(Ce_{1-x}L_x)(Mg_{1-y}Mn_y)Al_{11}O_{19}$, wherein L is Sc, Y and elements belonging to the lanthanoid series, and x and y are values satisfying the relationships $0 \leq x < 1$ and $0 \leq y < 1$, respectively, and wherein a ratio of a luminescence intensity at a wavelength of 380 nm to a luminescence intensity at a wavelength of 542 nm in a photoluminescence obtained by ultraviolet rays irradiated at a wavelength 253.7 nm is not more than 0.020.

15. A trivalent earth ion-containing aluminate phosphor according to claim 9, wherein a grain spherical degree is at least 0.5 and not more than 1.0, and wherein the grain spherical degree is defined by y/x, wherein x is a maximum of a length of a line segment connecting a point a on a surface of a grain and another point b on the surface of the grain, and y is a minimum of a length of a line segment connecting a point c and a point d, where c and d are points at which the perpendicular bisector of the line segment defined by the points a and b crosses the surface of the grain.

16. A trivalent rare earth ion-containing, aluminate phosphor according to claim 9, wherein a grain size concentration degree is no less than 0.4, the grain size concentration degree being defined by a maximum of x satisfying $xA \leq d(n) \leq A/x$, where $d(n)$ is a grain size of each of n (rains, and A is a median grain size of the grains.

17. A trivalent rare earth ion-containing, phosphor, which is based on a compound expressed by $(Ce_{1-x}L_x)(Mg_{1-y}Mn_y)Al_{11}O_{19}$, where L is at least one element selected from the group consisting of Sc, Y, and elements belonging to the lanthanoid series, and x and y are values satisfying $0 \leq x < 1$ and $0 \leq y < 1$.

18. The trivalent rare earth ion-containing aluminate phosphor according to claim 17, wherein a grain spherical degree is at least 0.5 and not more than 1.0, where the grain spherical degree is defined by y/x, where x is a maximum of a length of a line segment connecting a point a on a surface of a grain and another point b on the surface of the grain, and y is a minimum of a length of a line segment connecting a point c and a point d, where c and d are points at which the perpendicular bisector of the line segment defined by the points a and b crosses the surface of the grain.

19. The trivalent rare earth ion-containing aluminate phosphor according to claims 17, wherein L comprises Tb.

20. A light emitting device using the phosphor according to claim 17.

* * * * *